June 28, 1927.

F. S. FARNSWORTH 1,633,933

SPRING SUSPENSION OF VEHICLES

Filed Dec. 5, 1923  2 Sheets-Sheet 1

Inventor,
F. S. Farnsworth,
by
atty.

June 28, 1927.
F. S. FARNSWORTH
1,633,933
SPRING SUSPENSION OF VEHICLES
Filed Dec. 5, 1923     2 Sheets-Sheet 2
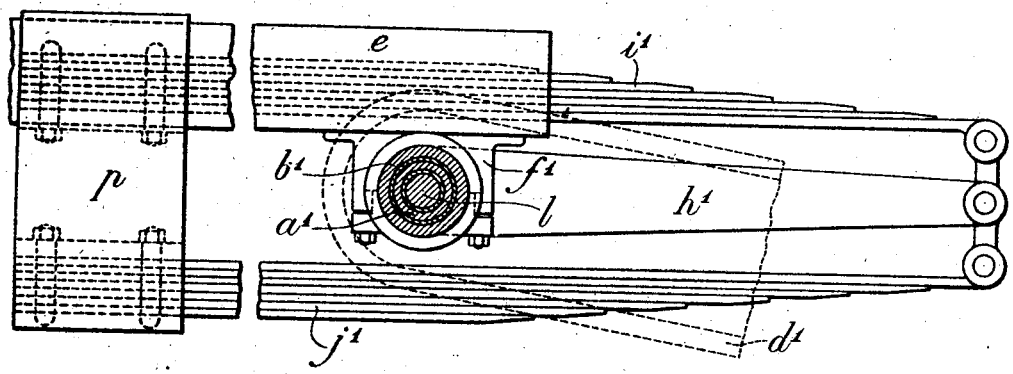
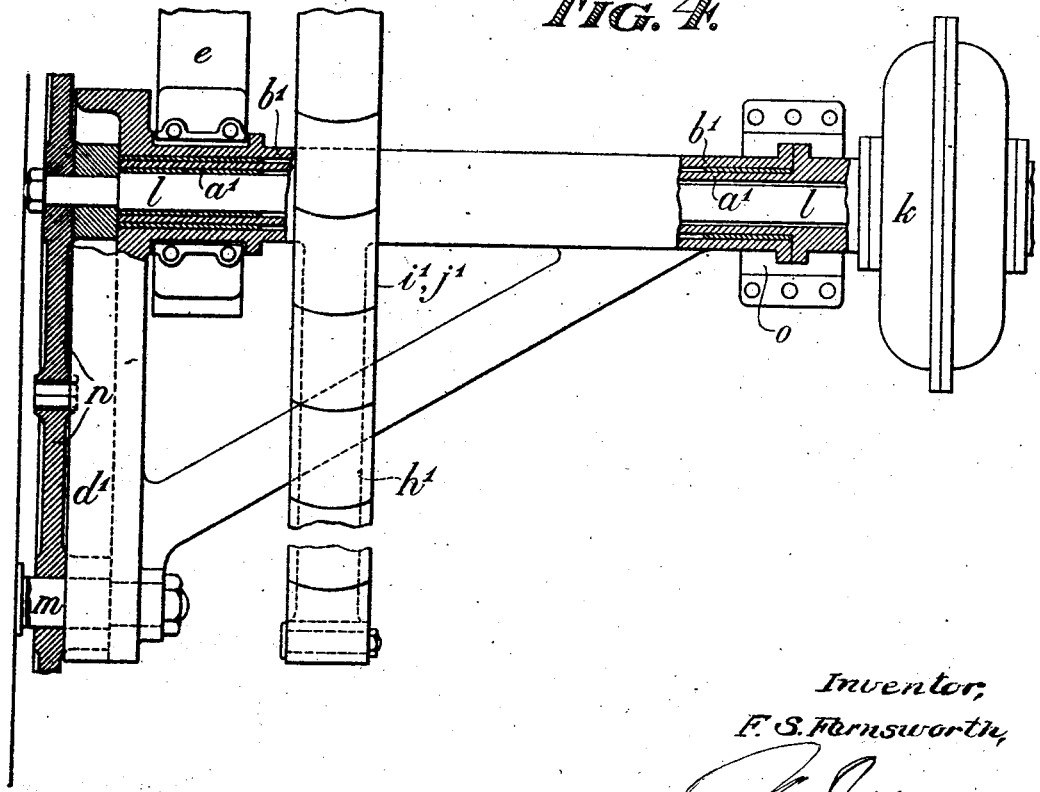

Patented June 28, 1927.

1,633,933

UNITED STATES PATENT OFFICE.

FRANK SMEDLEY FARNSWORTH, OF LONDON, ENGLAND.

SPRING SUSPENSION OF VEHICLES.

Application filed December 5, 1923, Serial No. 678,743, and in Great Britain December 15, 1922.

My invention relates to the spring suspension of vehicles.

An object of my invention is to provide an improved spring suspension which will allow the wheels mounted on the ends of an axle to move vertically or approximately vertically without seriously disturbing the level of the axle, or whereby, in other words, the axle will retain the horizontal position when either wheel moves vertically in passing over an obstacle. To obtain this result it follows that each wheel must be sprung separately, and that the flexion of any one spring or set of springs governing the action of one wheel must not be communicated to the springing arrangements of the other wheel. This result is of course impossible with the ordinary solid type of axle.

Another result obtained from the use of my improved suspension is the considerable reduction in the amount of "unsprung weight". By the usual methods of vehicle suspension the springs are mounted direct on to the axles, and the chassis or framework carrying the engine and transmission gear (in a motor car) and bodywork is in turn secured to the springs. By this construction any part of the vehicle mounted beneath the springs is totally "unsprung" except for the cushioning effect derived from the tyres. By the use of the improved suspension the weight of the axles and springs is fully sprung and the actual "unsprung weight" is reduced to little more than the weight of the wheels. Also, the springs are relieved of all side and driving stresses, their sole duty being to absorb shocks and vibration.

The invention refers to spring suspension systems of the kind in which it has been proposed to mount the road wheels on crank arms adapted to pivot on the ends of axles or on the chassis or body of the vehicle against the action of springs, each wheel being sprung separately and adapted to move relatively to said chassis or body independently of the other road wheels. In various constructions of the known systems it has been proposed to mount the crank arms on axles or on short sleeves mounted to rotate in bearings provided on the side members of the chassis or body, to provide load-carrying and rebound springs of different strengths, and to connect crank arms carrying the road wheels directly to load-carrying springs.

According to one feature of the present invention the crank arms of each pair of road wheels are carried by and movable with two elongated sleeves which are mounted to rotate freely on a stationary axle, rod or tube, extending completely, or substantially completely, across the chassis or body from side to side of the vehicle, and within bearings on said chassis or body, and each of said sleeves extends half the length of said axle, rod or tube, or approximately so, and is free to turn independently on the axle, rod or tube, and in its corresponding bearing.

Another feature of the invention consists in that crank arms of different lengths and provided on the sleeve of each wheel may be operatively connected to load-carrying or suspension springs and to rebound or reaction springs of different strengths My invention will now be described with reference to the accompanying diagrammatic drawings, in which:—

Figure 3 is a side elevation showing a convenient application of my invention to the rear axle of a motor car chassis, and Figure 4 is a part sectional plan of the suspension of Figure 3.

Figure 1:
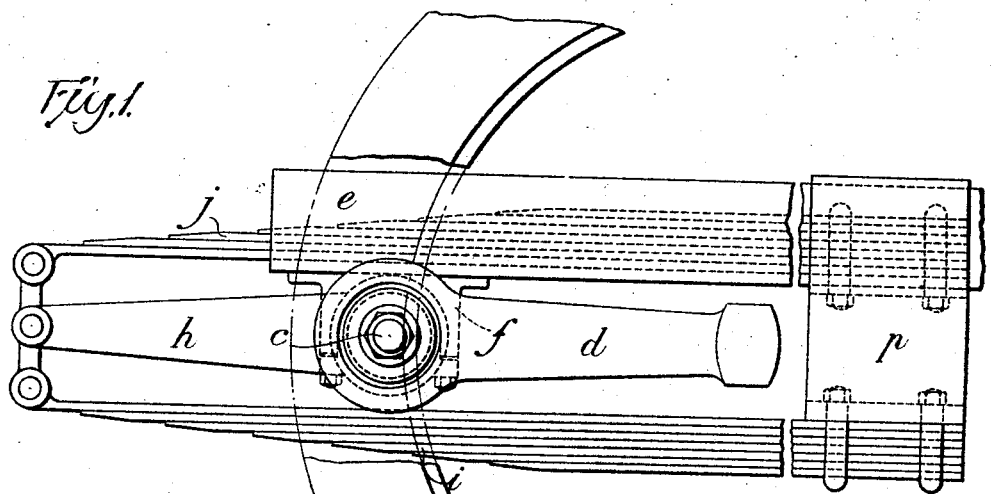
Figure 1 is a side elevation illustrating a suitable manner of applying my invention to the front axle of a motor car chassis.
Figure 2:
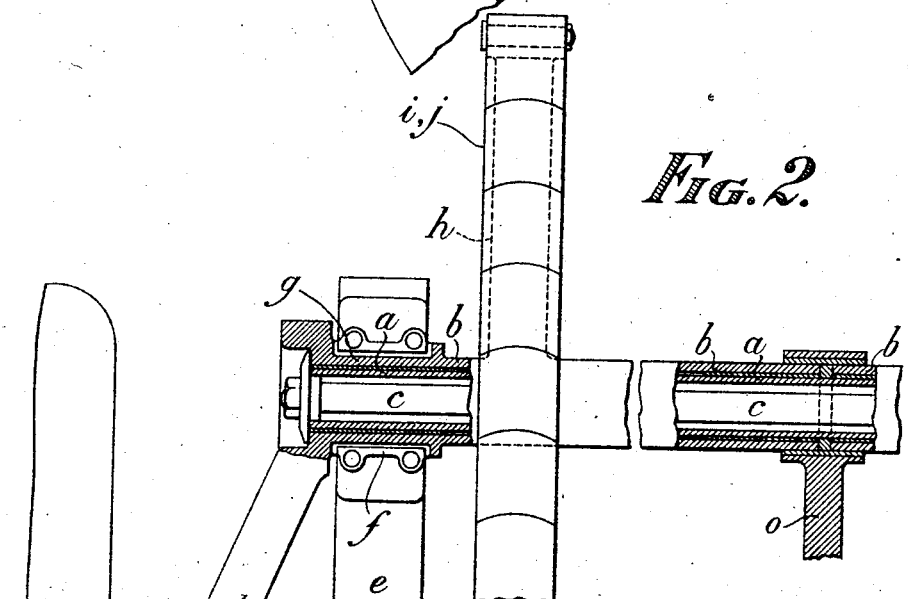
Figure 2 is a part sectional plan of the suspension shown in Figure 1.
Figure 5:
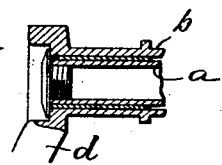
Fig. 5 is a sectional view illustrating a modification.

Thus, in a suitable manner of carrying out my invention, and dealing with the front axle first as shown in Figures 1 and 2, I employ a metal rod, or, preferably, a tube $a$ of suitable length for the required axle, on which tube are mounted two sleeves $b$ each approximately half the length of the tube, which sleeves are maintained in position on the tube, by any suitable means, such as by a tie rod $c$ passing through the tube and fitted with nuts and washers at its ends. If desired, the tie rod $c$ may be eliminated as illustrated in Figure 5. The sleeves $b$ are a working fit on the tube $a$ and are adapted to rotate thereon. At the outer ends of the sleeves $b$ are mounted crank-arms $d$ which are integral with or secured on the sleeves, and are of suitable length to carry the road wheels such as by means of stub axles. The rod or tube $a$ carrying the sleeves $b$ and the crank-arms $d$ is secured to the framework or side members *e* of the vehicle chassis by bearings *f* forming parts of, or fixed to, the said side members; the journals *g* working in the bearings *f* are formed at the outer ends of the sleeves *b* and as close as convenient to the crank-arms *d* carrying the road wheels. It must be understood that the sleeves *b* are free to rotate in the bearings *f*.

On each sleeve *b*, and as close as convenient to the inner side of the corresponding bearing *f*, is mounted another crank-arm *h* which is integral with or fastened on said sleeve, and has its outer end connected to or engaged with a load carrying spring *i* secured to the framework of the vehicle.

From the foregoing construction it will be seen that any movements of the crank-arms *d* carrying the road wheels are communicated to the crank-arms *h* on the sleeves *b* at the inner sides of the bearings *f* and thence to the springs *i* and *j*. As each sleeve *b* with its crank-arms *d* and *h* is free to move independently in the bearings *f* and about the rod or tube *a*, (subject to the control of the springs *i* and *j*), the vertical movement of one wheel will not affect the vertical movement of the other and companion wheel.

Dealing now with the rear axle, Figures 3 and 4, the construction follows the same general lines as with the front axle in so far as the sleeves *b'*, crank-arms *d'* carrying the road wheels, bearings *f'* and springs *i'* and *j'* are concerned. As it is a difficult matter for a rod or tube to be carried right through an axle having the usual type of rear drive employing worm or bevel gearing, the tubes *a'* may be bolted on each side of the centre worm or bevel casing *k* and the driving shaft *l* may pass through the centres of the tubes *a'*, the sleeves *b'* working about the tubes and in the bearings *f'* in the manner described above in connection with the front axle. For vehicles employing chain or shaft drive to each rear wheel a tube passing right through the axle may be used without difficulty. As the wheels have been removed from the usual direct line of drive some other and intermediate means must be employed to carry the drive to the wheels now mounted on stub axles *m* carried by the crank-arms *d'*. A pair of spur gear wheels *n* are shewn in the drawings, but chain drive or counter shaft drive may be used. If the pair of spur gear wheels are used the centre bevel or worm drive at *k* must be arranged accordingly, otherwise the drive would be reversed. The crank-arms *h'* co-operating with the springs *i'* and *j'* may, if preferred, be dispensed with, and the springs be arranged to connect or engage direct with the crank-arms *d'* carrying the road wheels.

The member *o*, shown at the inner ends of the sleeves *b*, *b'* covers the joint between the sleeves *b* of the front axle, Figures 1 and 2, or between the sleeves *b'* and centre casing *k* of the rear axle, Figures 3 and 4. The member *o* may be fixed to a cross member of the chassis framework and be in the nature of a bracket or bearing, or it may be a simple covering sleeve, the object being, besides covering the joint, to form a bearing to support the axle. In light cars the member *o* may be dispensed with.

The load carrying spring *i*, *i'* and the rebound or reaction springs *j*, *j'* are anchored to the chassis or framework *e* by means of brackets *p* or in any other suitable manner. The gear wheel *n* secured to the drive shaft *l* of Figures 3 and 4 may form part of or be fixed to a brake drum.

From the above description it will be appreciated that each road wheel of the vehicle is sprung separately and can move independently in a vertical direction, and that unsprung weight is reduced to the smallest possible amount. As the axles are carried in bearings fixed to the side members of the chassis or framework, and are unable to move in a vertical direction relatively to the chassis, improved mechanical efficiency is obtained as the rear axle is always kept in the same plane relatively to the gear box under every condition of load; universal joints are not called upon to correct differences of alignment and may even be dispensed with: these advantages quite offset the possible slight loss of efficiency in the introduction of an extra pair of gears in the rear wheel drive. The effect of an extra long wheel base is secured. The vehicle will hold the road much better than those provided with ordinary suspension, as one wheel passing over an obstacle does not affect the others: in passing over uneven surfaces the wheels adapt themselves to the contour of the road: the weight of the vehicle on the springs cannot produce a bouncing and rolling effect at speed as the axles are confined in the rigid bearings fixed to the framework of the chassis: this is a great improvement on the usual method of relying on the springs and shackle pins to resist rolling and twisting strains. A lighter construction of chassis is possible as radius rod and tongue tubes are not required and axles may be made lighter as they can be supported in the centre. The wear of tyres is reduced to a minimum. The improved spring suspension is equally adaptable to all types of automobiles, from the high powered racing car to the lorry and motor omnibus: with the former, higher speeds will be possible owing to the better road holding qualities and consequent reduction in wheel spin, and with the latter greater steadiness and comfort in riding will be realized together with an appreciable reduction in cost of upkeep and repairs.

The foregoing constructions are capable of variation to meet special purposes or conditions. Thus, crank arms of different lengths engaging with springs of different strengths may be mounted on the sleeves on either side of each bearing $f$, certain of said crank-arms being arranged to engage with load-carrying springs and the others for engaging with rebound springs. To secure efficient lubrication when a tube is used to carry the sleeves, this tube may be fitted with lubricant and have small holes drilled in its walls to allow the lubricant to reach the sleeve bearings.

The relationship between the lengths of the crank-arms may be such that the movement of a spring is less than that of its corresponding wheel, or vice versa. Thus, if the crank-arm carrying a wheel is longer than the crank-arm engaging the corresponding spring or springs, the movement of the spring or springs would be less than the movement of the wheel. In this manner the relative movement of a wheel and the spring or springs can be regulated by employing crank-arms of different lengths.

What I claim is:—

1. A vehicle spring suspension system including a rear axle, an elongated sleeve mounted for free rotation on the axle for substantially half the length of the latter, bearings carried by the vehicle frame for supporting the respective ends of the sleeve, a crank arm connected to the sleeve and supporting the wheels, a second crank arm connected to the sleeve and projected therefrom in a direction substantially at right angles to the sleeve, a vehicle spring supporting means, and a connection between said supporting means and the free end of the second crank arm.

2. A vehicle spring suspension system including a rear axle, an elongated sleeve mounted for free rotation on the axle for substantially half the length of the latter, bearings carried by the vehicle frame for supporting the respective ends of the sleeve, a crank arm connected to the sleeve, and supporting the wheels, a second crank arm connected to the sleeve and projected therefrom in a direction substantially at right angles to the sleeve, a vehicle spring supporting means including load springs and rebound springs of different strengths, and a connection between said supporting means and the free end of the second crank arm.

In testimony whereof I have hereunto signed my name.

FRANK SMEDLEY FARNSWORTH,

Certificate of Correction.

Patent No. 1,633,933. Granted June 28, 1927, to

FRANK SMEDLEY FARNSWORTH.

It is hereby certified that error appears in the printed specification of the above-numbered patent requiring correction as follows: Page 3, lines 28 and 42, claims 1 and 2, respectively, for "a rear" read *an;* and that the said Letters Patent should be read with these corrections therein that the same may conform to the record of the case in the Patent Office.

Signed and sealed this 23d day of August, A. D. 1927.

[SEAL.] M. J. MOORE,
*Acting Commissioner of Patents.*